(12) United States Patent
Takimoto et al.

(10) Patent No.: US 12,115,735 B2
(45) Date of Patent: Oct. 15, 2024

(54) RESIN CONNECTOR CONNECTION STRUCTURE AND METHOD OF MANUFACTURING THE SAME

(71) Applicant: Sumitomo Riko Company Limited, Aichi (JP)

(72) Inventors: Yorihiro Takimoto, Aichi (JP); Koji Mizutani, Aichi (JP); Kazuhiro Saiki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 21 days.

(21) Appl. No.: 18/150,182

(22) Filed: Jan. 4, 2023

(65) Prior Publication Data
US 2023/0158753 A1    May 25, 2023

Related U.S. Application Data

(63) Continuation of application No. PCT/JP2022/010007, filed on Mar. 8, 2022.

(30) Foreign Application Priority Data

Mar. 30, 2021 (JP) .................. 2021-058510

(51) Int. Cl.
*F16L 47/02* (2006.01)
*B29C 65/16* (2006.01)
*B29L 23/00* (2006.01)

(52) U.S. Cl.
CPC .............. *B29C 65/16* (2013.01); *F16L 47/02* (2013.01); *B29L 2023/22* (2013.01)

(58) Field of Classification Search
CPC ....... B29C 65/16; F16L 47/02; B29L 2023/22
See application file for complete search history.

(56) References Cited

U.S. PATENT DOCUMENTS

| 2004/0140668 A1 | 7/2004 | Monsheimer et al. |
| 2005/0251986 A1 | 11/2005 | Katayama et al. |
| (Continued) | | |

FOREIGN PATENT DOCUMENTS

| CN | 103640212 | 3/2014 |
| CN | 206582457 | 10/2017 |
| (Continued) | | |

OTHER PUBLICATIONS

"Written Opinion of the International Searching Authority (Form PCT/ISA/237) of PCT/JP2022/010007", mailed on May 24, 2022, with English translation thereof, pp. 1-8.

(Continued)

*Primary Examiner* — Daniel McNally
(74) *Attorney, Agent, or Firm* — JCIPRNET (57) ABSTRACT

A resin connector (10) includes a tubular connector main body portion (11) which is formed to contain a reinforcing filler in a main portion base material resin, and a tubular connector end portion (12) which is formed of a end portion base material resin without containing the reinforcing filler or containing the reinforcing filler at a lower proportion than the connector main body portion (11) and is joined to the connector main body portion (11) to constitute a tubular end portion. The resin tube (20) is formed of a material having a higher absorption rate of a laser beam than the connector end portion (12) and is fitted to the connector end portion (12) to be welded to an inner peripheral surface or an outer peripheral surface of the connector end portion (12) and not to be welded to the connector main body portion (11).

11 Claims, 2 Drawing Sheets

(56) References Cited

U.S. PATENT DOCUMENTS

| | | | |
|---|---|---|---|
| 2009/0218325 A1 | | 9/2009 | Kreischer et al. |
| 2011/0074145 A1 * | | 3/2011 | Schwarzkopf ...... B29C 66/1224 |
| | | | 285/21.2 |
| 2015/0174883 A1 | | 6/2015 | Han |

FOREIGN PATENT DOCUMENTS

| | | | | |
|---|---|---|---|---|
| CN | 206582457 U | * | 10/2017 | |
| DE | 202007006954 | | 9/2008 | |
| FR | 2812372 | | 2/2002 | |
| FR | 2812372 A1 | * | 2/2002 | ......... B29C 65/1635 |
| JP | 2004090628 | | 3/2004 | |
| JP | 2005193614 | | 7/2005 | |
| JP | 2009083406 | | 4/2009 | |
| JP | 2009532236 | | 9/2009 | |
| JP | 4503966 | | 7/2010 | |
| JP | 2012030559 | | 2/2012 | |
| JP | 2012213867 | | 11/2012 | |

OTHER PUBLICATIONS

"Office Action of Deutsches Counterpart Application", issued on Feb. 28, 2024, with English translation thereof, p. 1-p. 13.

* cited by examiner

RESIN CONNECTOR CONNECTION STRUCTURE AND METHOD OF MANUFACTURING THE SAME

CROSS-REFERENCE TO RELATED APPLICATION

This application is a continuation application of International Application number PCT/JP2022/010007 filed on Mar. 8, 2022, which claims the priority benefit of Japan Patent Application No. 2021-058510, filed on Mar. 30, 2021. The entirety of each of the above-mentioned patent applications is hereby incorporated by reference herein and made a part of this specification.

TECHNICAL FIELD

The present disclosure relates to a resin connector connection structure and a method of manufacturing the same.

BACKGROUND ART

In description of Patent Literature 1, a tube is inserted into a tubular band made of plastic that is transparent to a laser beam, and the band and the tube are welded to each other with a laser beam.

CITATION LIST

Patent Literature

[Patent Literature 1]
Japanese Patent No. 4503966

In connection between a resin connector and a resin tube (also referred to as a resin hose or a resin pipe), welding using a laser beam described in Patent Literature 1 can be considered. Here, in the resin connector, the resin tube is connected to a first opening side, and a separate connection target member is connected to a second opening side. This type of connector is formed to contain a filler such as a glass fiber filler in a base material resin in order to increase a bending elastic modulus (strength against deformation).

However, a transmittance of a laser beam changes depending on the presence or absence of the filler. Furthermore, the transmittance of a laser beam also changes depending on a density of the filler. Therefore, in a case where a welded portion between the resin connector and the resin tube is irradiated with a laser beam, heat energy generated at the welded portion varies due to an influence of the filler, and there is a possibility of joining strength varying depending on a position.

SUMMARY

The present disclosure has been made in view of such a background, and an objective of the present disclosure is to provide a resin connector connection structure capable of ensuring a bending elastic modulus of a resin connector while curbing a variation in joining strength between the resin connector and a resin tube and a method of manufacturing the same.

According to an aspect of the present disclosure, there is provided a resin connector connection structure including: a resin connector which has a tubular shape, and to both ends of the resin connector being configured to connect connection target members; and a resin tube which constitutes one of the connection target members, in the resin tube having a tubular shape, and the resin tube being fitted to a first opening side of the resin connector, wherein the resin connector includes a connector main body portion which has a tubular shape, the connector main body being formed of a main portion base material resin that contains a reinforcing filler, and a connector end portion which has a tubular shape, the connector end portion being formed of an end portion base material resin that (i) does not contain the reinforcing filler or (ii) contains the reinforcing filler at a lower proportion than the connector main body portion, and the connector end portion being directly or indirectly joined to the connector main body portion such that the connector end portion constitutes an end portion of the resin connector on the first opening side, and wherein the resin tube is formed of a material having a higher absorption rate of a laser beam than the connector end portion, and the resin tube is fitted to the connector end portion to be welded to an inner peripheral surface or an outer peripheral surface of the connector end portion and to be welded at a position other than an axial position at which the connector main body portion is positioned in the resin connector.

According to another aspect of the present disclosure, there is provided a method of manufacturing the resin connector connection structure described above, the method including: welding radially facing surfaces of the resin tube and the connector end portion to each other by emitting a laser beam from a side of the connector end portion in the radial direction in a state where the resin tube is fitted to the connector end portion.

DESCRIPTION OF EMBODIMENTS

According to the resin connector connection structure and the method of manufacturing the same described above, the connector main body portion of the resin connector contains the reinforcing filler and thus has a high bending elastic modulus. The connector end portion of the resin connector forms the welded portion with the resin tube. The connector end portion does not contain the reinforcing filler, or contains the reinforcing filler at a lower content proportion than the connector main body portion. Therefore, the bending elastic modulus of the connector end portion is lower than that of the connector main body portion.

However, the connector end portion is required to have a high joining strength caused by the welding with the resin tube and a small variation in the joining strength rather than the bending elastic modulus. Here, the connector end portion does not contain the reinforcing filler, or contains the reinforcing filler at a lower content proportion than the connector main body portion. Therefore, the connector end portion has a higher transmittance of the laser beam than the connector main body portion. Furthermore, it is possible to curb a variation in the joining strength of the welded portion between the connector end portion and the resin tube caused by the emission of the laser beam due to the filler.

That is, in the resin connector, the connector main body portion and the connector end portion are differentiated from each other in terms of a function. The connector main body portion functions as a portion that ensures the bending elastic modulus, and the connector end portion functions as a portion that ensures the joining strength caused by the welding with the resin tube. Therefore, the connection structure between the resin connector and the resin tube as a whole can ensure the bending elastic modulus of the resin connector while curbing the variation in joining strength between the resin connector and the resin tube.

Reference signs in parentheses in the claims indicate the correspondence with specific means described in embodiments which will be described later and do not limit the technical scope of the present disclosure.

1. First Embodiment

1-1. Configuration of Resin Connector Connection Structure 1

Figure 1:
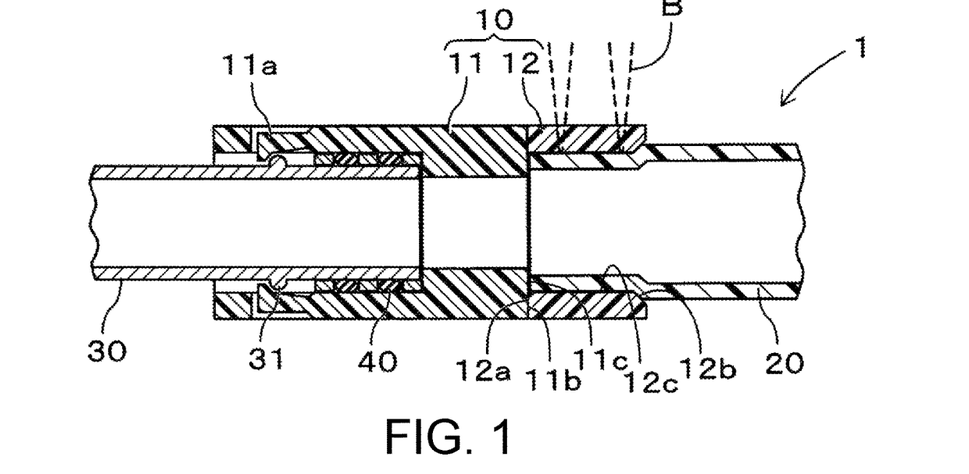
FIG. 1 is an axial cross-sectional view showing a resin connector connection structure of a first embodiment.

A configuration of a resin connector connection structure 1 will be described with reference to FIG. 1. As shown in FIG. 1, the resin connector connection structure 1 includes a resin connector 10, a resin tube 20 (also referred to as a resin hose or a resin pipe) that constitutes one of connection target members, and a pipe 30 that constitutes the other of the connection target members. The resin connector 10 functions as a member that mediates connection between the resin tube 20 and the pipe 30. The resin connector 10, the resin tube 20, and the pipe 30 are each formed in a tubular shape for circulating a fluid, and the fluid circulates between the resin tube 20 and the pipe 30 via the resin connector 10.

The resin connector 10 is formed of a resin in a tubular shape. However, the resin connector 10 is not limited to a straight tubular shape and may have a curved tubular shape. The resin tube 20 and the pipe 30, which are connection target members, are connected to both tubular ends of the resin connector 10. In the present embodiment, the resin connector 10 and the resin tube 20 are joined to each other by welding using a laser beam B (indicated by a dashed line in FIG. 1). On the other hand, the resin connector 10 and the pipe 30 are connected by locking with a claw or the like. However, the connection between the resin connector 10 and the pipe 30 is not limited to the locking and may be performed by an arbitrary method.

The resin tube 20 is formed in a long tubular shape. The resin tube 20 is formed longer than at least the resin connector 10. The resin tube 20 is fitted to a first opening side (a right end side in FIG. 1) of the resin connector 10. FIG. 1 illustrates a case where the resin tube 20 is inserted into the inside of the resin connector 10 on the first opening side, but the resin tube 20 may be mounted on the outside of the resin connector 10 on the first opening side.

The resin tube 20 is formed of a material having a high absorption rate of a laser beam B. That is, the resin tube 20 generates heat by being irradiated with the laser beam B. For example, in a case where gasoline is circulated, the resin tube 20 has a multi-layer structure in consideration of gasoline resistance, fuel permeation resistance, weather resistance, and the like. Moreover, the resin tube 20 may be formed in a straight tubular shape, or may be formed in a curved tubular shape.

The pipe 30 is formed of a metal or a resin in a tubular shape. The pipe 30 is fitted to a second opening side (a left end side in FIG. 1) of the resin connector 10. In the present embodiment, the pipe 30 is inserted into the inside of the resin connector 10 on the second opening side, but the pipe 30 may be fitted to the outside of the resin connector 10 on the second opening side. Further, the pipe 30 is provided with an annular flange 31 protruding radially outward at a position spaced apart from a tip end. The annular flange 31 of the pipe 30 is a portion that is locked to the resin connector 10 in an axial direction of a second opening portion of the resin connector 10.

1-2. Detailed Configuration of Resin Connector 10

A detailed configuration of a resin connector 10 will be described with reference to FIG. 1. The resin connector 10 includes a connector main body portion 11 and a connector end portion 12.

The connector main body portion 11 is disposed at least in an intermediate portion of the resin connector 10 in an axial direction (a central axis direction of the tubular shape of the resin connector 10). However, in the present embodiment, the connector main body portion 11 is disposed not only in the intermediate portion of the resin connector 10 in the axial direction but also in a portion constituting a second opening end. The connector main body portion 11 corresponds to a portion having a high bending elastic modulus. In particular, the connector main body portion 11 has a high bending elastic modulus in order to exhibit sufficient locking force with the pipe 30. Here, the resin tube 20 is not welded to the connector main body portion 11. That is, in the resin connector 10, the resin tube 20 is not welded to an axial position at which the connector main body portion 11 is positioned.

The connector main body portion 11 is formed in a tubular shape and is locked to the pipe 30. The connector main body portion 11 includes, for example, a locking claw 11a that is locked to the annular flange 31 of the pipe 3. The locking claw 11a is elastically deformed to allow the pipe 30 to be inserted and is locked to the annular flange 31 after the pipe 30 is inserted. That is, the locking claw 11a functions as a retaining member for the pipe 30.

In addition, the connector main body portion 11 includes a joining surface 11b for directly joining with the connector end portion 12 and a positioning end surface 11c for positioning the resin tube 20 by coming into contact with a tip end surface of the resin tube 20 at an end on a side opposite to a side into which the pipe 30 is inserted (a right end in FIG. 1). In the present embodiment, the positioning end surface 11c is positioned radially inside the joining surface 11b. Further, in the present embodiment, the joining surface 11b and the positioning end surface 11c are formed on the same plane, but they may be formed at different positions in the axial direction.

The connector main body portion 11 is required to have strength against deformation in order to lock with the pipe 30. Therefore, the connector main body portion 11 is formed to contain a reinforcing filler in a main portion base material resin.

Examples of the main portion base material resin include polypropylene, polyamide, polyphenylene sulfide, polyethylene terephthalate, polyethylene naphthalate, polybutylene terephthalate, polybutylene naphthalate, polymethylpentene, polyethylene, polyacetal, a fluorine resin, and the like. As the polypropylene, for example, one having a refractive index of 1.47 to 1.51 is used. As the polyamide, for example, one having a refractive index of 1.51 to 1.55 is used.

As the reinforcing filler, glass fiber, carbon fiber, potassium titanate, glass beads, milled fiber, talc, and the like are used. Here, since the connector main body portion 11 is not a portion irradiated with the laser beam B for welding, it is not necessary to consider a transmittance of the laser beam B for the reinforcing filler used in the connector main body portion 11. Therefore, the reinforcing filler may be applied without considering the refractive index.

The resin connector connection structure 1 preferably includes an annular sealing member 40 such as an O-ring between an inner peripheral surface of the connector main body portion 11 and an outer peripheral surface of the pipe 30. The sealing member 40 can ensure sealing performance between the connector main body portion 11 and the pipe 30.

The connector end portion 12 constitutes a portion of the resin connector 10 on the first opening side, that is, an end portion on a side into which the resin tube 20 is inserted. The connector end portion 12 corresponds to a welded portion with the resin tube 20. The connector end portion 12 is formed in a tubular shape.

Further, in the present embodiment, the connector end portion 12 has a joining surface 12*a* that is directly joined to the joining surface 11*b* of the connector main body portion 11 at an axial end portion. The connector end portion 12 is directly joined to the connector main body portion 11 by, for example, two-color molding, friction welding, or the like. That is, the joining surface 12*a* of the connector end portion 12 is directly joined to the joining surface 11*b* of the connector main body portion 11. However, the connector end portion 12 may be indirectly joined to the connector main body portion 11 via a separate member. Further, the joining surface 12*a* of the connector end portion 12 may be provided at an outer peripheral surface or an inner peripheral surface without being limited to the axial end portion.

Furthermore, in the connector end portion 12, the outer peripheral surface and the inner peripheral surface are exposed over the entire circumference at least in part in the axial direction. In particular, the outer peripheral surface and the inner peripheral surface of the connector end portion 12 are exposed at a portion of the resin connector 10 on the first opening side. That is, it means that the connector main body portion 11 does not present in the exposed portion of the connector end portion 12.

The connector end portion 12 includes a guide portion 12*b* formed in a tapered shape on the inner peripheral surface of an opening end of the connector end portion 12. The maximum inner diameter of the tapered shape of the guide portion 12*b* is approximately the same as an outer diameter of a tip end portion of the resin tube 20 or slightly larger than the outer diameter of the tip end portion of the resin tube 20. Further, the minimum inner diameter of the tapered shape of the guide portion 12*b* is smaller than the outer diameter of the tip end portion of the resin tube 20. Therefore, when the resin tube 20 is inserted into the inside of the connector end portion 12, the guide portion 12*b* comes into contact with an outer peripheral surface of the resin tube 20. The guide portion 12*b* guides contraction of the resin tube 20.

Further, the connector end portion 12 includes a cylindrical inner peripheral surface portion 12*c* which is formed adjacent to the guide portion 12*b* on the inner peripheral surface of the connector end portion 12 and is formed in a cylindrical inner peripheral surface shape. The cylindrical inner peripheral surface portion 12*c* is formed over the entire axial range between the tapered guide portion 12*b* and the joining surface 12*a* that is directly joined to the connector main body portion 11.

An inner diameter of the cylindrical inner peripheral surface portion 12*c* of the connector end portion 12 matches the minimum inner diameter of the guide portion 12*b*. That is, the inner diameter of the cylindrical inner peripheral surface portion 12*c* is smaller than the outer diameter of the tip end portion of the resin tube 20. Therefore, the tip end portion of the resin tube 20 is inserted into the inside of the cylindrical inner peripheral surface portion 12*c* in the radial direction in a contracted state. That is, the cylindrical inner peripheral surface portion 12*c* is brought into a state in which the outer peripheral surface of the resin tube 20 having a reduced diameter is in close contact with the cylindrical inner peripheral surface portion 12*c*.

The connector end portion 12 is required to have joining strength with the resin tube 20. As described above, the connector end portion 12 and the resin tube 20 are joined to each other by being welded together by being irradiated with the laser beam B. Here, the resin tube 20 is formed of a material having a higher absorption rate of the laser beam B than the connector end portion 12.

The higher the transmittance of the laser beam B, the better the connector end portion 12, and the smaller the variation in the transmittance of the laser beam B, the better the connector end portion 12. The higher the transmittance of the laser beam B, the more the laser beam B can be emitted to the welded portion. The smaller the variation in the transmittance of the laser beam B, the smaller the variation in the joining strength caused by the welding. In particular, it is known that the filler affects the variation in the transmittance of the laser beam B. Therefore, the connector end portion 12 is formed without containing the reinforcing filler in the end portion base material resin, or is formed to contain the reinforcing filler in the base resin for an end portion at a lower proportion than the connector main body portion 11.

In a case where the reinforcing filler is not contained, the end portion base material resin only has to be any resin material that transmits the laser beam B. In a case where the reinforcing filler is not contained, of course, there is no effect of the reinforcing filler, and thus there is no variation in the transmittance of the laser beam B due to the reinforcing filler. In this case, examples of the end portion base material resin include polypropylene, polyamide, polyphenylene sulfide, polyethylene terephthalate, polyethylene naphthalate, polybutylene terephthalate, polybutylene naphthalate, polymethylpentene, polyethylene, polyacetal, a fluorine resin, and the like.

Here, from the viewpoint of a joining force between the connector main body portion 11 and the connector end portion 12, the main portion base material resin of the connector main body portion 11 and the end portion base material resin of the connector end portion 12 are preferably polymers of the same type. However, even polymers of different types can be mechanically or chemically connected to each other as long as they have close melting points or have functional groups (for example, maleic anhydride and the like).

In a case where the connector end portion 12 contains the reinforcing filler, it is required not to interfere with the transmission of the laser beam B and not to greatly affect the variation in the transmittance of the laser beam B. Therefore, firstly, it is effective to make a content proportion of the reinforcing filler extremely low. Secondly, it is possible to make the refractive index of the end portion base material resin and the refractive index of the reinforcing filler close to each other. For example, it is preferable that a difference in refractive index be within 0.02. However, even if a reinforcing filler having a refractive index close to that of the end portion base material resin is used, it is preferable that the content proportion of the reinforcing filler be low.

When the reinforcing filler is contained, polypropylene, polyamide, or the like is used as the end portion base material resin. As the polypropylene, for example, one having a refractive index of 1.47 to 1.51 is used. As the polyamide, for example, one having a refractive index of 1.51 to 1.55 is used.

A glass fiber filler is used as the reinforcing filler having a refractive index close to that of the end portion base material resin. The refractive index of the glass fiber filler is, for example, 1.4 to 1.7. Examples of the glass fiber which is a material of the glass filler include D glass (low dielectric constant glass), NE glass (acid-resistant alkali glass), A glass (alkali glass), S glass (high strength and high elastic modulus glass), alkali-resistant glass, and the like.

The connector end portion 12 and the resin tube 20 are welded to each other by the laser beam B. In the present embodiment, the cylindrical inner peripheral surface portion 12c of the connector end portion 12 and the outer peripheral surface of the tip end portion of the resin tube 20 are welded to each other. Specifically, the welded portion between the connector end portion 12 and the resin tube 20 is formed in a ring shape that is closed over the entire circumference. For example, the welded portions may be formed at a plurality of locations in the axial direction, or the welded portion may be formed at one location in the axial direction. In order to ensure the joining strength caused by the welding, it is preferable to ensure a width of the welded portion to be equal to or larger than a specified width. The welded portions formed at a plurality of locations are a plurality of discontinuous welded portions each having a ring shape.

The welded portion is positioned at a position spaced apart from a boundary portion between the connector main body portion 11 and the connector end portion 12. That is, the welded portion does not include the connector main body portion 11. In other words, the resin tube 20 is welded to a position of the resin connector 10 other than the axial position at which the connector main body portion 11 is positioned. In further other words, the resin tube 20 is welded to a portion of the connector end portion 12 which is exposed to the outer peripheral surface and the inner peripheral surface. Furthermore, the resin tube 20 is welded to the cylindrical inner peripheral surface portion 12c of the connector end portion 12, but is not welded to the guide portion 12b.

1-3. Method of Manufacturing Resin Connector Connection Structure 1

Figure 2:
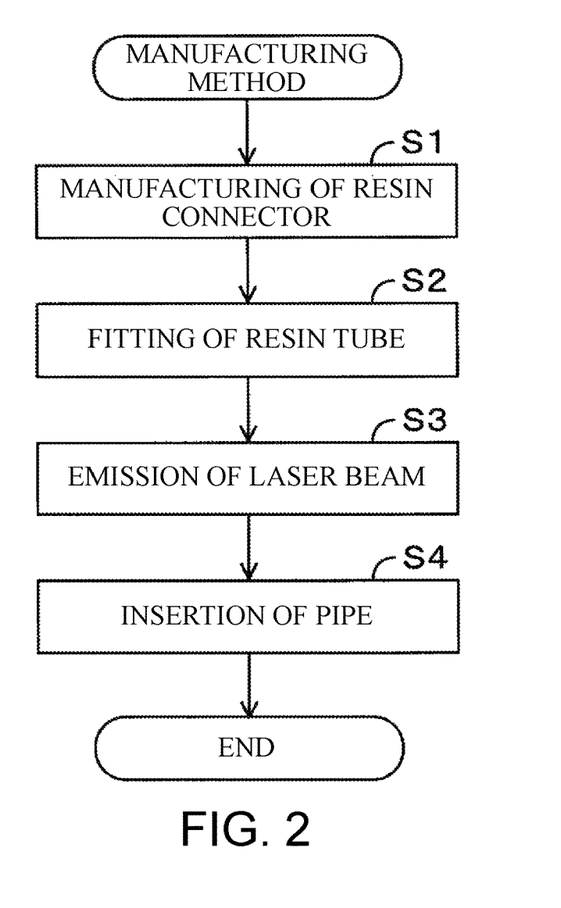
FIG. 2 is a flow chart showing a method of manufacturing the resin connector connection structure of the first embodiment.

Next, a method of manufacturing the resin connector connection structure 1 will be described with reference to FIGS. 1 and 2. First, as shown in FIG. 2, the resin connector 10 is manufactured (S1). In the present embodiment, the connector main body portion 11 and the connector end portion 12 are integrally formed with each other by two-color molding. In this manner, the connector main body portion 11 and the connector end portion 12 are directly joined to each other.

Subsequently, the tip end portion of the resin tube 20 is inserted into the opening (the first opening) of the resin connector 10 on a side of the connector end portion 12 (S2). Due to a relationship between the maximum inner diameter and the minimum inner diameter of the guide portion 12b of the connector end portion 12 and the outer diameter of the tip end portion of the resin tube 20, an outer peripheral edge of the tip end portion of the resin tube 20 comes into contact with the guide portion 12b.

When the resin tube 20 is inserted into the connector end portion 12, the tip end portion of the resin tube 20 is contracted while the outer peripheral edge of the tip end portion of the resin tube 20 comes into contact with the guide portion 12b. The tip end portion of the resin tube 20 comes into close contact with the cylindrical inner peripheral surface portion 12c of the connector end portion 12 in a contracted state. The resin tube 20 is inserted to a position at which the tip end of the resin tube 20 comes into contact with the positioning end surface 11c of the connector main body portion 11.

Subsequently, in a range where the resin tube 20 is fitted (inserted in the present embodiment) to the connector end portion 12, the laser beam B is emitted from a side of the connector end portion 12 in the radial direction, that is, from an outside in the radial direction, to weld radially facing surfaces of the connector end portion 12 and the resin tube 20 to each other (S3).

The connector end portion 12 is formed of a material that transmits the laser beam B, and the resin tube 20 is formed of a material that absorbs the laser beam B. Further, in S2, the cylindrical inner peripheral surface portion 12c of the connector end portion 12 and the outer peripheral surface of the tip end portion of the resin tube 20 are in close contact with each other. Further, the axial portion of the connector end portion 12 that is in close contact with the resin tube 20 corresponds to a portion of the connector end portion 12 which is exposed to the outer peripheral surface and the inner peripheral surface.

In this state, the connector end portion 12 is irradiated with the laser beam B from the outside in the radial direction. That is, the laser beam B is emitted to a portion of the connector end portion 12 of the resin connector 10 which is exposed to the outer peripheral surface and the inner peripheral surface. In other words, the portion irradiated with the laser beam B is a portion formed only by the connector end portion 12 in the entire radial width of the resin connector 10. As a result, most of the laser beam B is transmitted through the connector end portion 12, heat is generated on the facing surface (the close contact surface) between the connector end portion 12 and the resin tube 20, and the connector end portion 12 and the resin tube 20 are welded to each other. In particular, the laser beam B is emitted such that the welded portions between the connector end portion 12 and the resin tube 20 are formed at a plurality of locations in the axial direction and are formed in a closed ring shape over the entire circumference.

For example, when the plurality of locations in the axial direction is irradiated with the laser beam B, the welded portions in a ring shape which each have an irradiation width of the laser beam B may be formed at the plurality of locations in the axial direction. In addition, when the laser beam B is spirally emitted such that some of irradiation ranges of the laser beam B overlap each other, the welded portion in a ring shape which has a longer axial length than the irradiation width of the laser beam B may be formed at one location. Further, in a case where the irradiation width of the laser beam B is equal to or larger than a specified width for ensuring the joining strength, when only one location in the axial direction is irradiated with the laser beam B, the welded portion in a ring shape which has an irradiation width of the laser beam B may be formed at the one location in the axial direction.

Subsequently, the pipe 30 is inserted into the connector main body portion 11 (S4). In this manner, the resin connector connection structure 1 is manufactured.

1-4. Effects

According to the resin connector connection structure 1, the connector main body portion 11 of the resin connector 10 contains the reinforcing filler and thus has a high bending elastic modulus. The connector end portion 12 of the resin connector 10 forms the welded portion with the resin tube 20. The connector end portion 12 does not contain the reinforcing filler, or contains the reinforcing filler at a lower content proportion than the connector main body portion 11. Therefore, the bending elastic modulus of the connector end portion 12 is lower than that of the connector main body portion 11.

However, the connector end portion 12 is required to have a high joining strength caused by the welding with the resin tube 20 and a small variation in the joining strength rather than the bending elastic modulus. Here, the connector end portion 12 does not contain the reinforcing filler, or contains the reinforcing filler at a lower content proportion than the connector main body portion 11. Therefore, the connector end portion 12 has a higher transmittance of the laser beam B than the connector main body portion 11. Furthermore, it is possible to curb a variation in the joining strength of the welded portion between the connector end portion 12 and the resin tube 20 caused by the emission of the laser beam B due to the reinforcing filler.

That is, in the resin connector 10 the connector main body portion 11 and the connector end portion 12 are differentiated from each other in terms of a function. The connector main body portion 11 functions as a portion that ensures the bending elastic modulus, and the connector end portion 12 functions as a portion that ensures the joining strength caused by the welding with the resin tube 20. Therefore, the connection structure between the resin connector 10 and the resin tube 20 as a whole can ensure the bending elastic modulus of the resin connector 10 while curbing the variation in joining strength between the resin connector 10 and the resin tube 20.

In particular, by making the connector end portion 12 not contain the reinforcing filler, it is possible to further curb the variation in joining strength at the welded portion. If the connector end portion contains the reinforcing filler, it is preferable that the content proportion of the reinforcing filler be low and the end portion base material resin and the reinforcing filler have the refractive indexes close to each other.

Further, the resin tube 20 is inserted into the inside of the connector end portion 12 in the radial direction, and the outer peripheral surface of the resin tube 20 is welded to the inner peripheral surface of the connector end portion 12. With this configuration, the laser beam B can be emitted from the outside in the radial direction, and thus the equipment and the emission of the laser beam B are facilitated. In particular, it is preferable that the resin tube 20 be inserted the inside of the connector end portion 12 in the radial direction in a contracted state. As a result, the adhesion between the resin tube 20 and the connector end portion 12 is enhanced, and the welding caused by the laser beam B can be easily performed, and the variation in joining strength can be curbed.

Further, the welded portion is the cylindrical inner peripheral surface portion 12c of the connector end portion 12, not the tapered guide portion 12b. If the tapered guide portion 12b is used as the welded portion, the heat energy generated by the emission of the laser beam B may vary depending on a position because the radial thickness of the connector end portion 12 varies in the axial direction. However, when the cylindrical inner peripheral surface portion 12c is used as the welded portion, it is possible to curb the variation in the joining strength.

Further, the welded portion is positioned at a position spaced apart from a boundary portion between the connector main body portion 11 and the connector end portion 12. As a result, it is possible to prevent the laser beam B from being affected by the reinforcing filler contained in the connector main body portion. Therefore, the variations in joining strength can be curbed.

Further, the welded portion is formed in a ring shape that is closed over the entire circumference. As a result, the welded portion exhibits a sealing function between the connector end portion 12 and the resin tube 20. Furthermore, it is preferable that the welded portions be formed at a plurality of locations in the axial direction. As a result, a high sealing function can be exhibited while ensuring a high joining strength.

2. Second Embodiment

Figure 3:
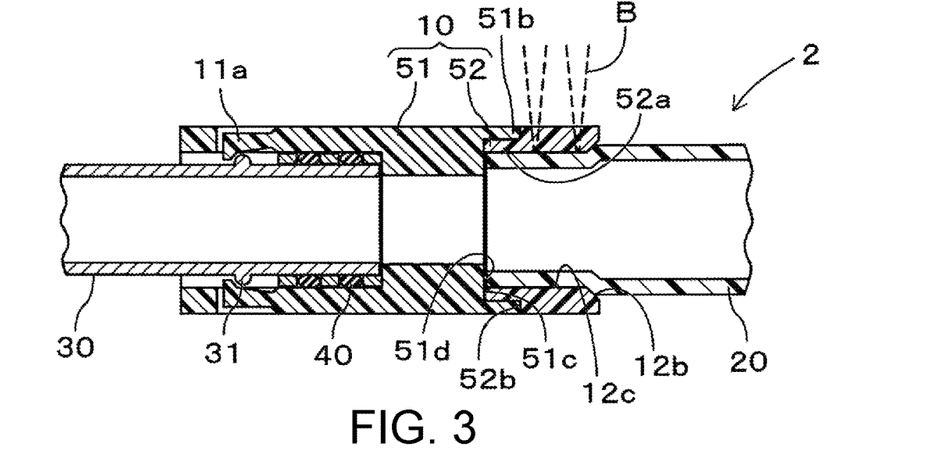
FIG. 3 is an axial cross-sectional view showing a resin connector connection structure of a second embodiment.

A resin connector connection structure 2 of a second embodiment will be described with reference to FIG. 3. The resin connector connection structure 2 of the present embodiment differs from the resin connector connection structure 1 of the first embodiment in a connector main body portion 51 and a connector end portion 52. However, in the resin connector connection structure 2, the same components as those of the resin connector connection structure 1 of the first embodiment are denoted by the same reference signs, and the description thereof is omitted.

The connector main body portion 51 has a tubular main body jaw portion 51b which extends toward the connector end portion 52. The main body jaw portion 51b axially protrudes from an outer portion of an axial end surface in the radial direction. The axial end surface of the main body jaw portion 51b, an inner peripheral surface of the main body jaw portion 51b, and a surface 51c which is normal to the axial direction at a base of the main body jaw portion 51b constitute a joining surface for directly joining with the connector end portion 52. That is, the joining surface is formed stepwise. The connector main body portion 51 has a positioning end surface 51d having a normal line in the axial direction in the inside of the main body jaw portion 51b in the radial direction. In the present embodiment, the surface 51c and the positioning end surface 51d are positioned on the same plane.

The connector end portion 52 has a tubular end jaw portion 52a which extends toward the connector main body portion 51. The end jaw portion 52a axially protrudes from an inner portion of an axial end surface in the radial direction. The axial end surface of the end jaw portion 52a, an outer peripheral surface of the end jaw portion 52a, and a surface 52b which is normal to the axial direction at a base of the end jaw portion 52a constitute a joining surface for directly joining with the connector main body portion 51. That is, the joining surface is formed stepwise.

According to the present embodiment, an area of the joining surface between the connector main body portion 51 and the connector end portion 52 can be enlarged. Therefore, the joining strength between the connector main body portion 51 and the connector end portion 52 can be increased.

Here, the welded portion is a portion of the connector end portion 52 on an opening end side of the connector end portion 52 (the first opening side of the resin connector 10) rather than the end jaw portion 52a. That is, the portion irradiated with the laser beam B is a portion formed only by the connector end portion 52 in the entire radial width of the resin connector 10.

3. Third Embodiment

Figure 4:
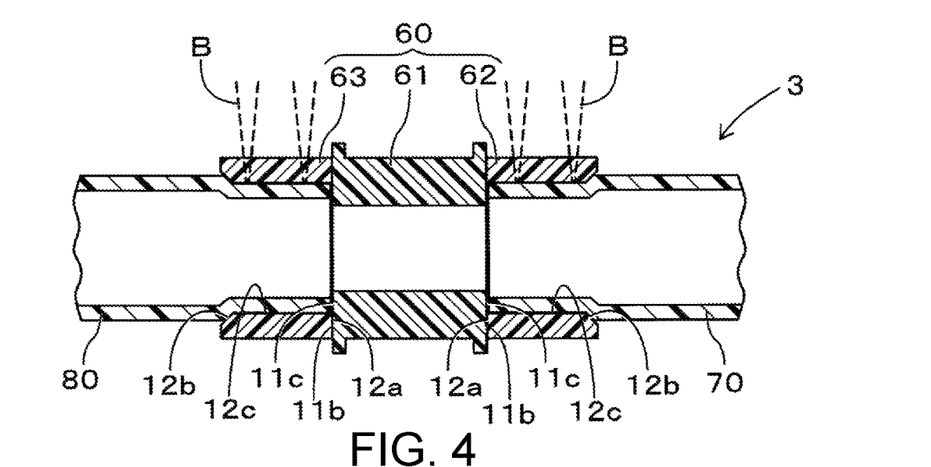
FIG. 4 is an axial cross-sectional view showing a resin connector connection structure of a third embodiment.

A resin connector connection structure 3 of a third embodiment will be described with reference to FIG. 4. The resin connector connection structure 3 includes a resin connector 60, a first resin tube 70, and a second resin tube 80. The resin connector 60 includes a connector main body portion 61, a first connector end portion 62 positioned on a first opening side (a right side in FIG. 4) of the resin connector 60, and a second connector end portion 63 positioned on a second opening side (a left side in FIG. 4) of the resin connector 60.

The connector main body portion 61 requires, for example, a bending elastic modulus for fixing it to a mating member. The first connector end portion 62 is directly joined to one axial end (a right end in FIG. 4) of the connector main body portion 61. The second connector end portion 63 is directly joined to the other axial end (a left end in FIG. 4) of the connector main body portion 61. In this manner, the connector main body portion 61, the first connector end portion 62, and the second connector end portion 63 are integrally formed with each other. The first connector end portion 62 is joined to the first resin tube 70 by welding using the laser beam B. The second connector end portion 63 is joined to the second resin tube 80 by welding using the laser beam B.

Here, a relationship between the first connector end portion 62 and the first resin tube 70 and a relationship between the second connector end portion 63 and the second resin tube 80 are substantially the same as a relationship between the connector end portion 12 and the resin tube 20 in the first embodiment. In FIG. 4, the reference signs of the parts in the first embodiment are given.

4. Fourth Embodiment

Figure 5:
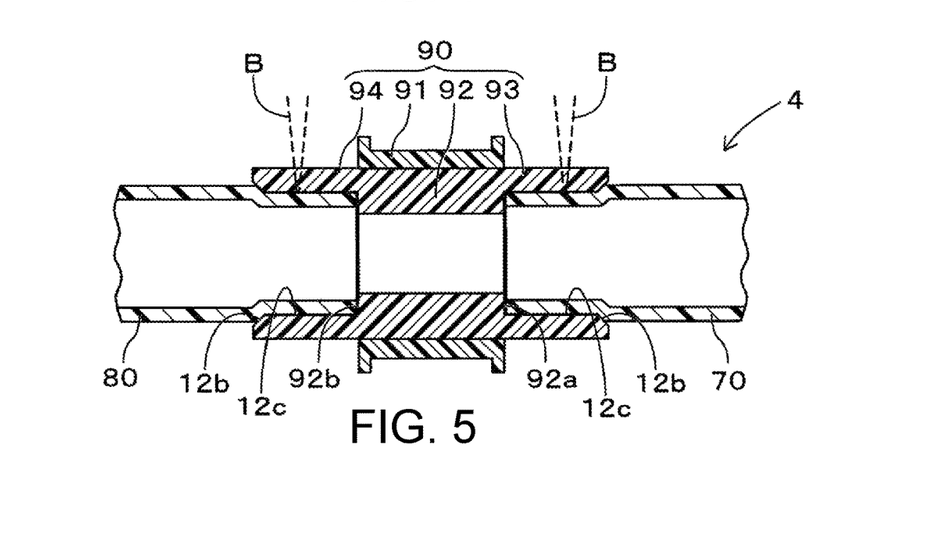
FIG. 5 is an axial cross-sectional view showing a resin connector connection structure of a fourth embodiment.

A resin connector connection structure 4 of a fourth embodiment will be described with reference to FIG. 5. In the following description, in the resin connector connection structure 4, the same components as those of the resin connector connection structure 3 of the third embodiment are denoted by the same reference signs, and the description thereof is omitted.

The resin connector connection structure 4 includes a resin connector 90, a first resin tube 70, and a second resin tube 80. The resin connector 90 includes a connector main body portion 91, a low-strength intermediate portion 92, a first connector end portion 93 positioned on a first opening side (a right side in FIG. 5) of the resin connector 90, and a second connector end portion 94 positioned on a second opening side (a left side in FIG. 5) of the resin connector 90.

The connector main body portion 91 is formed in a tubular shape and constitutes an outer layer of an intermediate part of the resin connector 90 in the axial direction. The connector main body portion 91 requires, for example, a bending elastic modulus for fixing it to a mating member. Therefore, the connector main body portion 91 is formed to contain a reinforcing filler in a main portion base material resin.

The low-strength intermediate portion 92 is formed in a tubular shape and constitutes an inner layer of the intermediate part of the resin connector 90 in the axial direction. The low-strength intermediate portion 92 is directly joined to an inner peripheral surface of the connector main body portion 91. The low-strength intermediate portion 92 includes a positioning end surface 92a which is normal to the first opening side (the right side in FIG. 5) and a positioning end surface 92b which is normal to the second opening side (the left side in FIG. 5). The positioning end surface 92a positions the first resin tube 70 by coming into contact with a tip end surface of the first resin tube 70. The positioning end surface 92b positions the second resin tube 80 by coming into contact with a tip end surface of the second resin tube 80.

The low-strength intermediate portion 92 does not require a high bending elastic modulus unlike the connector main body portion 91 and only has to ensure the shape of the positioning end surfaces 92a and 92b. Therefore, the low-strength intermediate portion 92 is formed without containing the reinforcing filler in the base material resin, or is formed to contain the reinforcing filler in the base resin at a lower proportion than the connector main body portion 91.

The first connector end portion 93 is formed in a tubular shape and is formed integrally with one axial end (the right end in FIG. 5) of the low-strength intermediate portion 92. Further, in the present embodiment, for example, the first connector end portion 93 may be integrally formed with the low-strength intermediate portion 92 by injection molding or the like. However, the first connector end portion 93 may be formed of a material different from that of the low-strength intermediate portion 92 and joined to the low-strength intermediate portion 92.

Here, the first connector end portion 93 is formed similarly to the first connector end portion 62 in the third embodiment. Therefore, the first connector end portion 93 is joined to the first resin tube 70 by welding using the laser beam B.

The second connector end portion 94 is formed in a tubular shape and is formed integrally with the other axial end (the left end in FIG. 5) of the low-strength intermediate portion 92. Further, in the present embodiment, for example, the second connector end portion 94 may be integrally formed with the low-strength intermediate portion 92 by injection molding or the like. However, the second connector end portion 94 may be formed of a material different from that of the low-strength intermediate portion 92 and joined to the low-strength intermediate portion 92.

Here, the second connector end portion 94 is formed similarly to the second connector end portion 63 in the third embodiment. Therefore, the second connector end portion 94 is joined to the second resin tube 80 by welding using the laser beam B.

In the present embodiment, the first connector end portion 93 is disposed continuously with the low-strength intermediate portion 92 and is connected to the connector main body portion 91 via the low-strength intermediate portion 92. That is, the first connector end portion 93 is directly joined only to the low-strength intermediate portion 92 and not directly joined to the connector main body portion 91. Therefore, the first connector end portion 93 is indirectly joined to the connector main body portion 91 via the low-strength intermediate portion 92. The first connector end portion 93 may be directly joined to both the connector main body portion 91 and the low-strength intermediate portion 92, or may be directly joined to only the connector main body portion 91.

Similarly, in the present embodiment, the second connector end portion 94 is disposed continuously with the low-strength intermediate portion 92 and is connected to the connector main body portion 91 via the low-strength intermediate portion 92. That is, the second connector end portion 94 is directly joined only to the low-strength intermediate portion 92 and not directly joined to the connector main body portion 91. Therefore, the second connector end portion 94 is indirectly joined to the connector main body portion 91 via the low-strength intermediate portion 92. The second connector end portion 94 may be directly joined to both the connector main body portion 91 and the low-strength intermediate portion 92, or may be directly joined to only the connector main body portion 91.

The present embodiment also has the same effect as the third embodiment. Moreover, since a volume of the connector main body portion 91 can be reduced, the cost can be reduced. Furthermore, in a case where the low-strength intermediate portion 92, the first connector end portion 93, and the second connector end portion 94 are integrally molded with each other by injection molding or the like, an area of the joining surface between the integrally molded body and the connector main body portion 91 can be enlarged. Therefore, the joining strength between the connector main body portion 91 and the integrally molded body, that is, the joining strength between the connector main body portion 91 and the connector end portions 93 and 94, can be increased.

5. Others

In the first embodiment, the connector end portion 12 and the resin tube 20 are welded to each other by emitting the laser beam B from the outside in the radial direction in a state where the resin tube 20 is inserted into the inside of the connector end portion 12. In addition, the connector end portion 12 and the resin tube 20 may be welded to each other by emitting the laser beam B from the inner side in the radial direction, that is, a side of the connector end portion 12 in the radial direction in a state where the resin tube 20 is fitted to the outside of the connector end portion 12.

Further, in the first embodiment, the connector main body portion 11 is formed to include a claw that is locked to the pipe 30. Alternatively, the following is also possible. A plurality of annular protrusions protruding in the radial direction is formed on the outer peripheral surface of the connector main body portion 11 in the axial direction. The pipe 30 may be expanded and fitted to the outer peripheral surface of the connector main body portion 11 to be axially locked to the plurality of annular protrusions.

Further, in the fourth embodiment, the resin connector 90 is formed to include the low-strength intermediate portion 92. Also in the first embodiment and the second embodiment, a member corresponding to the low-strength intermediate portion 92 may be provided.

The invention claimed is:

1. A resin connector connection structure (1, 2, 3, 4) comprising:
   a resin connector (10, 60, 90) which has a tubular shape, and to both opening end sides of the resin connector being configured to connect connection target members (20, 30, 70, 80); and
   a pipe (30) which constitutes another one of the connection target members, the pipe having an annular flange (31), and the pipe (30) being fitted to a second opening side of the resin connector (10, 60, 90),
   a resin tube (20, 70, 80) which constitutes one of the connection target members, in the resin tube having a tubular shape, and the resin tube being fitted to a first opening side of the resin connector,
   wherein the resin connector includes:
   a connector main body portion (11, 51, 61, 91) which has a tubular shape and a locking claw (11a), the connector main body being formed of a main portion base material resin that contains a reinforcing filler, and
   a connector end portion (12, 52, 62, 63, 93, 94) which has a tubular shape, the connector end portion being formed of an end portion base material resin that (i) does not contain the reinforcing filler or (ii) contains the reinforcing filler at a lower proportion than the connector main body portion, and the connector end portion being directly or indirectly joined to the connector main body portion such that the connector end portion constitutes an end portion of the resin connector on the first opening side, and
   wherein the resin tube is formed of a material having a higher absorption rate of a laser beam than the connector end portion, and the resin tube is fitted to the connector end portion to be welded to an inner peripheral surface or an outer peripheral surface of the connector end portion and to be welded at a position other than an axial position at which the connector main body portion is positioned in the resin connector,
   the locking claw (11a) is elastically deformable to allow the pipe (30) to be inserted and being locked to the annular flange (31) of the pipe (30).

2. The resin connector connection structure (1, 2, 3, 4) according to claim 1, wherein the resin tube is inserted into an inside of the connector end portion in a radial direction, and an outer peripheral surface of the resin tube is welded to the inner peripheral surface of the connector end portion.

3. The resin connector connection structure (1, 2, 3, 4) according to claim 2, wherein the resin tube is inserted into the inside of the connector end portion in the radial direction in a contracted state.

4. The resin connector connection structure (1, 2, 3, 4) according to claim 3,
   wherein the connector end portion includes:
   a guide portion (12b) which is formed in a tapered shape on an inner peripheral surface of an opening end of the connector end portion to guide contraction of the resin tube, and
   a cylindrical inner peripheral surface portion (12c) which is formed adjacent to the guide portion on the inner peripheral surface of the connector end portion, and the cylindrical inner peripheral surface being formed in a cylindrical inner peripheral surface shape, and
   wherein the resin tube is welded to the cylindrical inner peripheral surface portion of the connector end portion, and the resin tube is not welded to the guide portion of the connector end portion.

5. The resin connector connection structure (1, 2, 3, 4) according to claim 1, wherein the connector end portion does not contain the reinforcing filler.

6. The resin connector connection structure (1, 2, 3, 4) according to claim 1, wherein a welded portion between the resin tube and the connector end portion is positioned at a position spaced apart from a boundary portion between the connector main body portion and the connector end portion.

7. The resin connector connection structure (1, 2, 3, 4) according to claim 1, wherein a welded portion between the resin tube and the connector end portion is formed in a ring shape that is closed over an entire circumference.

8. The resin connector connection structure (2) according to claim 1,
   wherein the connector main body portion (51) has a tubular main body jaw portion (51b) which extends toward the connector end portion, and
   wherein the connector end portion (52) includes a tubular end jaw portion (52a) which extends toward the connector main body portion and faces the main body jaw portion in a radial direction to be joined to the main body jaw portion.

9. The resin connector connection structure (1, 2, 3, 4) according to claim 1, wherein the main portion base material resin and the end portion base material resin are polymers of the same type.

10. The resin connector connection structure (1, 2, 3, 4) according to claim 1, wherein the resin tube (20, 70, 80) is inserted into an inside of the connector end portion (12, 52, 62, 63, 93, 94) in a radial direction, and an outer peripheral surface of the resin tube (20, 70, 80) is welded to the inner peripheral surface of the connector end portion (12, 52, 62, 63, 93, 94), wherein a tip end portion of the resin tube (20, 70, 80) is inserted into an inside of the connector end portion (12, 52, 62, 63, 93, 94) in the radial direction in a contracted state, wherein the connector end portion (12, 52, 62, 63, 93, 94) includes:

a guide portion (12b) which is formed in a tapered shape on an inner peripheral surface of an opening end of the connector end portion to guide contraction of the resin tube (20, 70, 80), and a cylindrical inner peripheral surface portion (12c) which is formed adjacent to the guide portion on the inner peripheral surface of the connector end portion (12, 52, 62, 63, 93, 94), and the cylindrical inner peripheral surface being formed in a cylindrical inner peripheral surface shape, and wherein the resin tube (20, 70, 80) is welded to the cylindrical inner peripheral surface portion (12c) of the connector end portion (12, 52, 62, 63, 93, 94), and the resin tube (20, 70, 80) is not welded to the guide portion (12b) of the connector end portion (12, 52, 62, 63, 93, 94), the guide portion (12b) is in close contact with the outer peripheral surface of the tip end portion of the resin tube.

11. A method of manufacturing the resin connector connection structure (1, 2, 3, 4) according to claim 1, the method comprising:

welding (S3) radially facing surfaces of the resin tube and the connector end portion to each other by emitting a laser beam from a side of the connector end portion in the radial direction in a state where the resin tube (20, 70, 80) is fitted to the connector end portion (12, 52, 62, 63, 93, 94).

\* \* \* \* \*